(12) United States Patent
Thompson et al.

(10) Patent No.: US 6,658,858 B1
(45) Date of Patent: Dec. 9, 2003

(54) FOOD CHILLER WITH ENCLOSING AIR DUCT SYSTEM (SE-2)

(75) Inventors: Mark S. Thompson, Milwaukee, WI (US); George A. Clark, Lewis Center, OH (US)

(73) Assignee: Delta T, LLC, Racine, WI (US)

( * ) Notice: Subject to any disclaimer, the term of this patent is extended or adjusted under 35 U.S.C. 154(b) by 0 days.

(21) Appl. No.: 10/192,201

(22) Filed: Jul. 10, 2002

(51) Int. Cl.[7] .................. F25B 21/02; F25D 17/04
(52) U.S. Cl. ................ 62/3.6; 62/3.2; 62/457.9; 62/407
(58) Field of Search ............ 62/3.2, 3.6, 457.9, 62/407

(56) References Cited

U.S. PATENT DOCUMENTS

| | | |
|---|---|---|
| 2,446,686 A | 8/1948 | Behrens |
| 2,915,884 A | 12/1959 | Haushalter et al. |
| 3,040,539 A | 6/1962 | Gaugler |
| 3,823,567 A | 7/1974 | Corini |
| 3,986,337 A | 10/1976 | Richard |
| 4,297,850 A | 11/1981 | Reed |
| 4,326,383 A | 4/1982 | Reed et al. |
| 4,472,945 A | 9/1984 | Cech et al. |
| 4,726,193 A | 2/1988 | Burke et al. |
| 4,823,554 A | 4/1989 | Trachtenberg et al. |
| 4,845,958 A | 7/1989 | Senda et al. |
| 5,042,258 A | 8/1991 | Sundhar |
| 5,111,664 A | 5/1992 | Yang |
| 5,209,069 A | 5/1993 | Newnan |
| 5,247,798 A | 9/1993 | Collard, Jr. |
| 5,315,830 A | 5/1994 | Doke et al. |
| 5,423,194 A | 6/1995 | Senecal |
| 5,431,021 A | 7/1995 | Gwilliam et al. |
| 5,456,164 A | 10/1995 | Bang |
| 5,598,713 A | 2/1997 | Bartilucci |
| 5,661,979 A * | 9/1997 | DeBoer ............ 62/3.6 |
| 5,699,669 A | 12/1997 | Gebhard |
| 5,718,124 A * | 2/1998 | Senecal ............ 62/457.6 |
| 5,771,709 A | 6/1998 | Smith |
| 5,782,094 A | 7/1998 | Freeman |
| 5,813,233 A | 9/1998 | Okuda et al. |
| 6,226,994 B1 | 5/2001 | Yamada et al. |
| 6,295,820 B1 * | 10/2001 | Cauchy et al. ....... 62/3.6 |
| 6,308,519 B1 | 10/2001 | Bielinski |
| 6,351,951 B1 | 3/2002 | Guo et al. |
| 6,385,976 B1 | 5/2002 | Yamamura et al. |

OTHER PUBLICATIONS

US 6,381,965, 5/2002, Ghoshal (withdrawn)

* cited by examiner

Primary Examiner—William C. Doerrler
(74) Attorney, Agent, or Firm—Andrus, Sceales, Starke & Sawall

(57) ABSTRACT

A fruit chiller includes a bowl-like fruit container and a removable cover, each of which has a two layer wall defining therebetween annular cooling air flow passages. Cool air is delivered from a lower base and, when the cover is on the container, cool air flows upwardly through the interconnected annular passages and into the container at the top of the cover. The air flows downwardly and exits the container at the bottom, thereby maximizing the distance between the cool air inlet and outlet to maximize the time the cool air remains within the container.

11 Claims, 5 Drawing Sheets

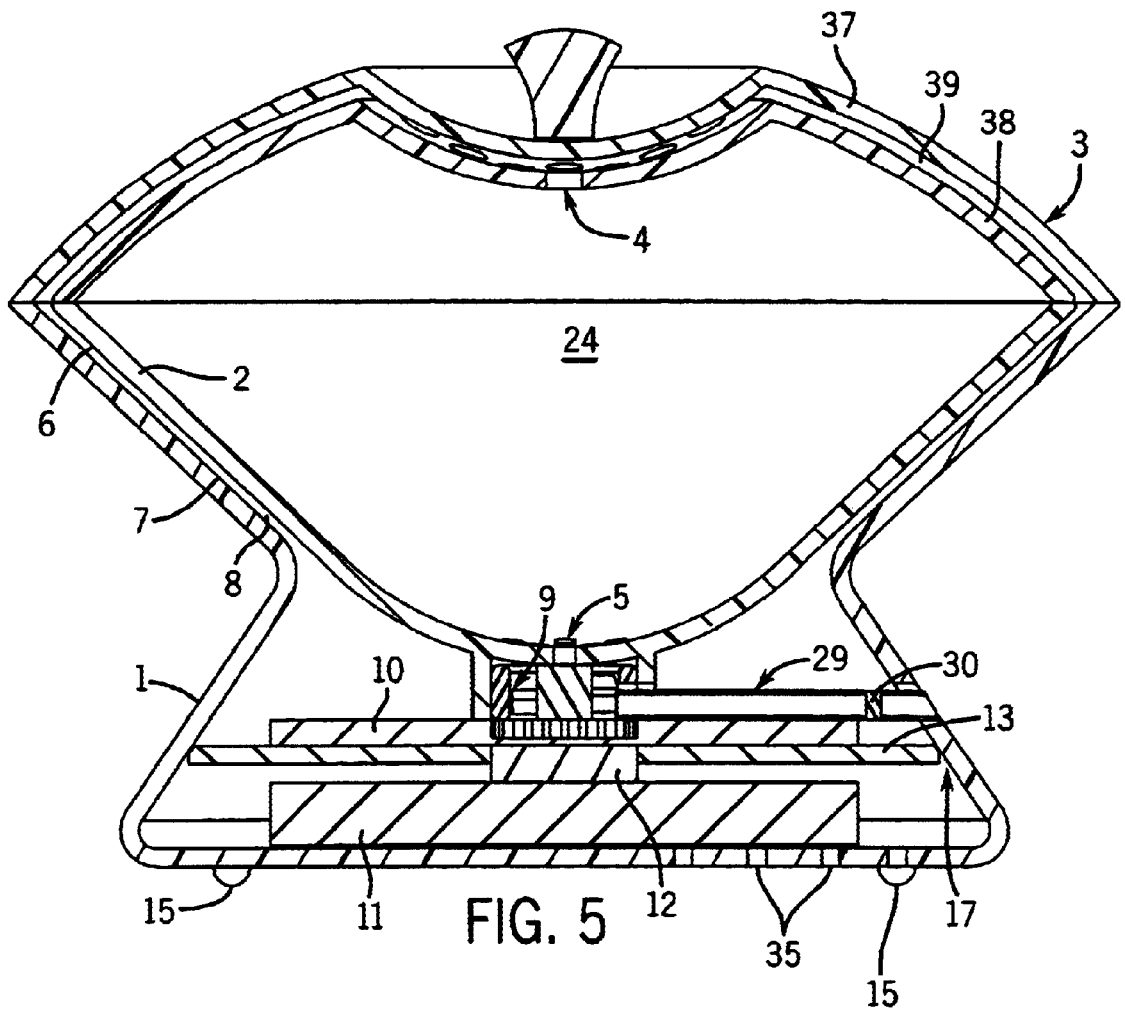

FOOD CHILLER WITH ENCLOSING AIR DUCT SYSTEM (SE-2)

BACKGROUND OF THE INVENTION

The present invention relates to a device for chilling fresh fruit and other fresh food products and, more particularly, to an improved countertop fruit chiller utilizing a Peltier effect thermoelectric device.

Thermoelectric devices operating in accordance with the well know Peltier effect have been used as cooling/heating devices for many years. Such a thermoelectric device comprises an array of semiconductor couples connected electrically in series and thermally in parallel. The semiconductor couples are sandwiched between metalized ceramic substrates. When DC electric current is applied in series to the thermoelectric device, it acts as a heat pump with heat being absorbed on the cold side, thereby cooling it, while heat is dissipated at the other side. Reversing the current causes the direction of heat flow to be reversed. Attaching a heat sink and a cold sink to the respective hot and cold sides may enhance the efficiency of the thermoelectric device.

Peltier effect devices have long been used to provide coolers and/or heaters for keeping foods fresh or for warming foods for serving. It has also been found and is well known to use forced-air convection to aid in heat transfer. A small electric fan is typically used to circulate air past the cold sink and into and through a container for the food, while another fan moves ambient outside air across the heat sink to dissipate heat from it.

Although chillers for fresh fruit and other perishable food products are well known in the art, the market success of such devices has been limited. There appear to be a number of reasons for this lack of market success. One is the cost and heat transfer efficiency of the solid state thermoelectric modules. In addition, the need to provide circulation of cool air to attain the greatest cooling efficiency has led to complex duct systems which add substantially to the cost of the containers, typically made of molded plastic materials. Another issue with prior chillers is inadequate distribution of the cool air amongst the food to be chilled. Food that is stored in the upper areas of some chillers is often inadequately cooled because the cold air does not reach this portion of the food container and because natural convection causes the warmer air to rise to the top of the food container. All of these noted issues with current chillers are addressed in the invention disclosed herein.

SUMMARY OF THE INVENTION

In accordance with the present invention, a chiller for fresh fruit or other perishable food products utilizes a construction which optimizes a cooling air flow and thus heat transfer efficiency with a container construction that is less expensive to manufacture and permitting the use of a relatively smaller thermoelectric module. Thermoelectric modules of increased efficiency, such as disclosed in U.S. Pat. No. 5,448,109 is particularly suitable for use in the fruit chiller of the subject invention.

In its broadest aspect, the food chiller of the present invention comprises a base housing for mounting a Peltier effect thermoelectric module sandwiched between a cold sink and an opposite heat sink. An inner bowl or food container portion is adjacent the base housing and contains an enclosing sidewall and a removable or openable cover for retrieval of the food. The housing, together with an internal baffle and food container, also defines a duct system that includes a cool air supply duct in heat transfer communication with the cold sink, a return air duct, and a cool air circulation fan in the cooling duct system to circulate air therethrough. The removable cover is composed of an outer structure and an inner liner. The cool air supply duct extends into the removable cover between the outer structure and the inner liner. The cold air enters the food container area through a plurality of holes in the inner layer of the cover and exits the food container area through a plurality of outlet holes in the lower portion of the food container.

The food container portion is normally closed with a removable or openable cover such that cooling air is continuously recirculated. In one embodiment, however, an outside ambient air supply conduit communicates with the cooling duct system and includes a metering device to admit a controlled flow of outside air to assist in purging the cooling duct system of ethylene gas and other ripening by-products of fruit. The metering device may comprise a small diameter tube connected to the duct system upstream of the fan.

To help maintain the interior temperature of the container, a removable insulating sleeve may be inserted into the container. The sleeve is shaped to conform to the interior of the enclosing sidewall. The removable cover may also be provided with an insulating liner.

Various arrangements of partitions may be placed within the container to divide the container into different temperature zones by varying the flow of cooling air through the zones. Such partitions may be vertically disposed to extend upwardly from the container bottom wall or may be horizontally disposed and attached, for example, to a central tower or to the container sidewall.

BRIEF DESCRIPTION OF THE DRAWINGS

FIG. 5 is a vertical section through the fruit chiller shown in FIG. 5.

DETAILED DESCRIPTION OF THE PREFERRED EMBODIMENT

Figure 1:
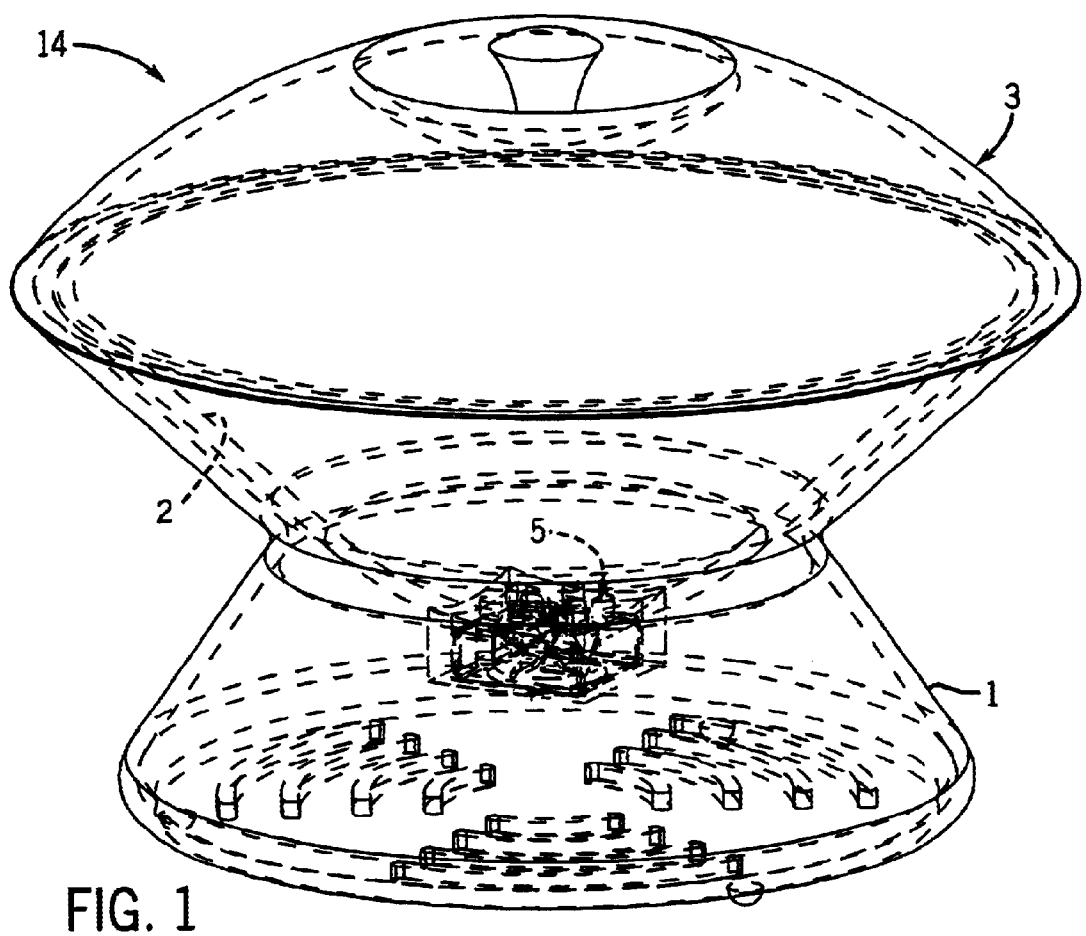
FIG. 1 is a perspective view showing the general arrangement of the fruit chiller of the subject invention.
Figure 2:
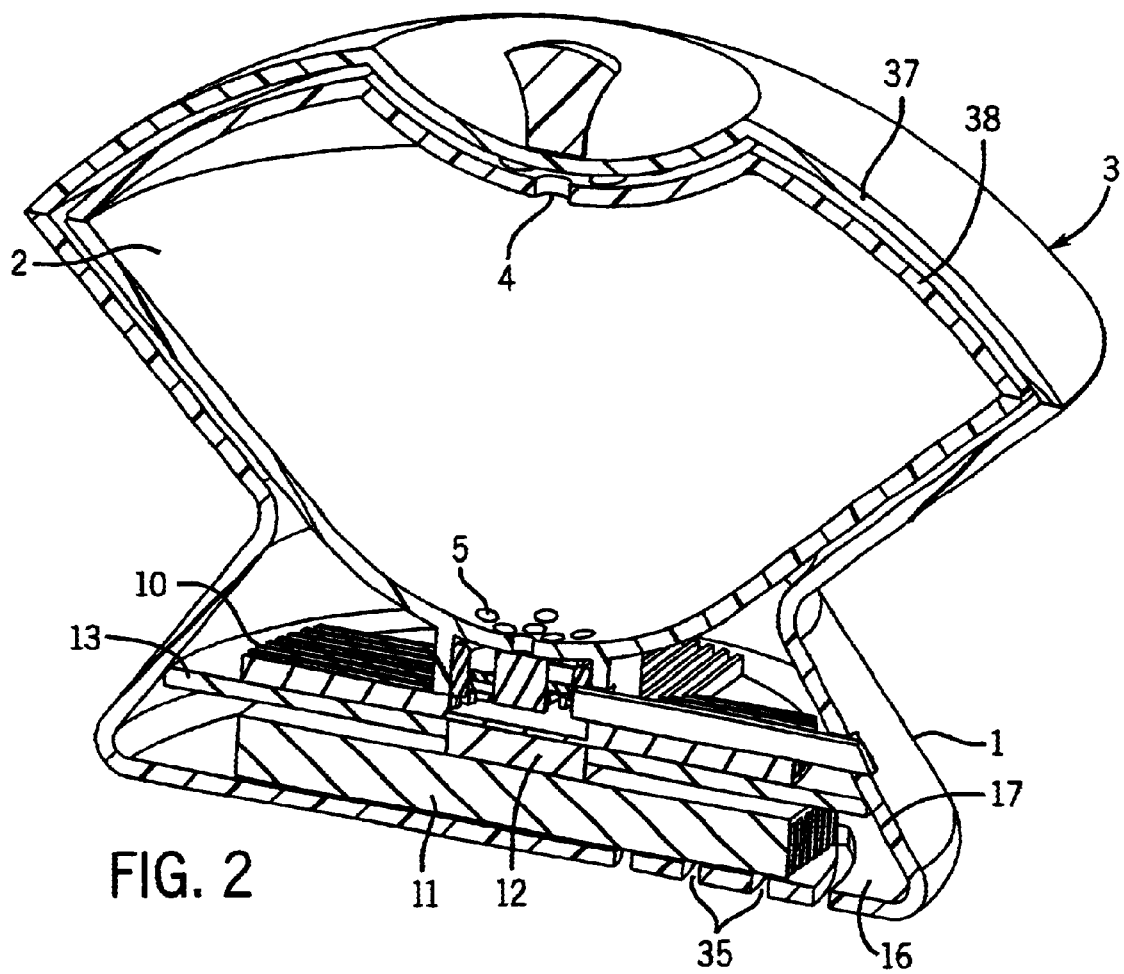
FIG. 2 is a perspective view of the fruit chiller of FIG. 1 cut in half for viewing of the interior components.
Figure 3:
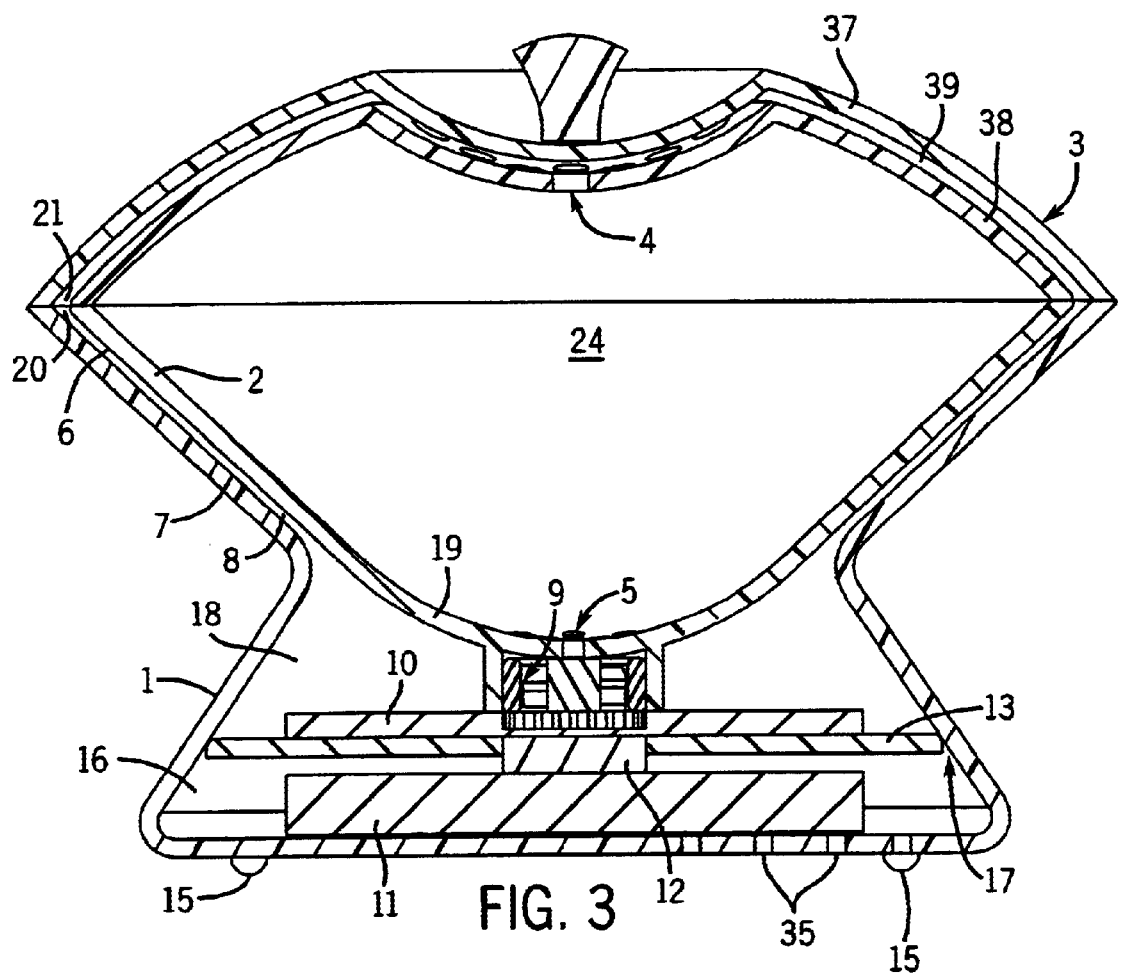
FIG. 3 is a vertical section through the fruit chiller shown in FIG. 1.

In FIGS. 1 through 3, there is shown a fruit chiller 14 in accordance with one embodiment of the present invention. The fruit chiller includes a supporting base 1 for supporting the chiller on a horizontal surface. There is space inside the base for housing various components of the cooling system, which will be described in detail herein. A food container 2 is seated within base 1. Base 1 surrounds the sides and bottom of food container 2. A removable cover 3 provides access to the food to be preserved. The chilled air travels through an annular space between food container 2 and housing 1 and between an inner layer 38 of cover 3 and an outer layer 37 of cover 3. The air enters food container area 24 via holes 4 in the inner layer 38 of cover 3. Centrally located holes 5 in the bottom of food container 2 provide a return path for the air. Upon passing through holes 5, the air is again cooled and discharged through holes 4. While this is a preferred embodiment it is also possible to reverse the airflow thus using holes 5 as discharge ports and holes 4 as a return air port. The base 1, container 2 and removable cover 3 may all be made of injection molded plastic materials. The base 1 and the container 2 are preferably opaque and the cover 3 transparent.

Referring also to FIGS. 2 and 3, the base 1 is suitably supported on feet 15 to provide an open space beneath the base for the entry of ambient cooling air through slots 35. The lower interior of base 1 defines a substantially open ambient air chamber 16 defined generally by base side walls 17 and a base baffle 13.

The container 2 and the food products contained therein are cooled with thermoelectric module 12 utilizing the well-known Peltier effect. The thermoelectric module 12 is mounted in the base baffle 13 and positioned generally horizontally in the plane of baffle 13. By applying a DC current to the module, heat will be absorbed at one face (in this case the upper side of 12), thereby cooling it. Heat will be dissipated at the other face of the module (in this case the lower side of 12), thereby heating it. As is also well known in the prior art, a cold sink 10 is attached to the upper face and a heat sink 11 is attached to the lower face of the module. The cold sink 10 is typically made of aluminum and includes a base plate and a series of closely spaced fins. Similarly, the heat sink 11 includes an aluminum base plate and integral closely spaced fins. The heat rejected by the operating thermoelectric module 12 at the heat sink 11 is dissipated by a flow of ambient air through the ambient air chamber 16 via slots 35.

Figure 4:
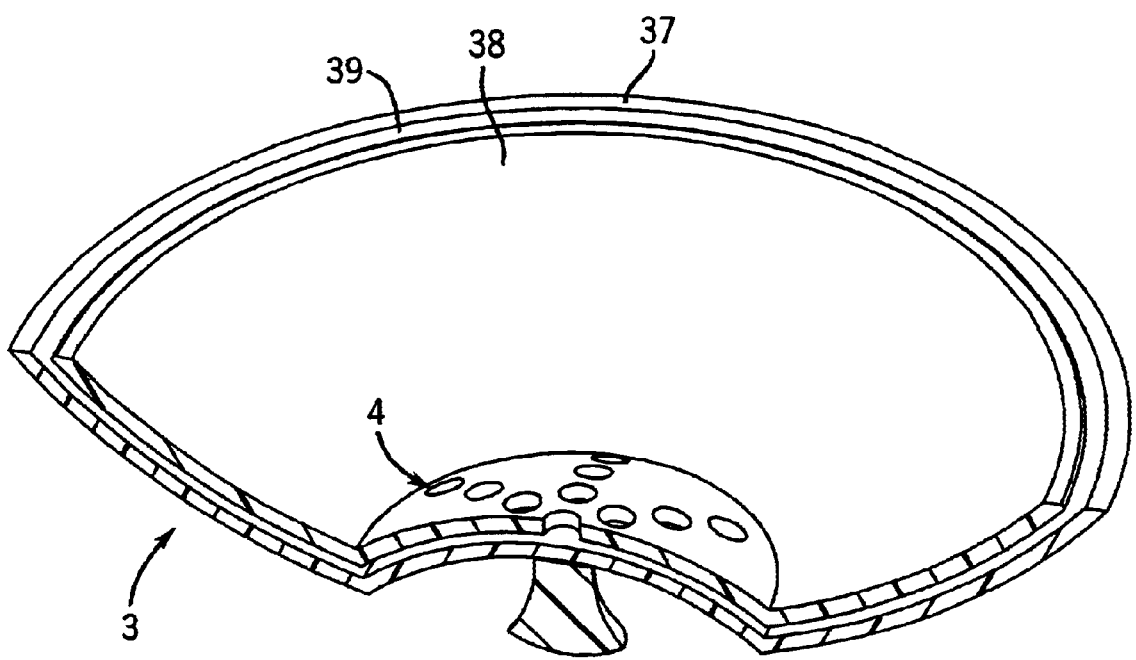
FIG. 4 is a perspective of the cover of the fruit chiller of FIG. 1 cut in half for viewing of the structural aspects.

An inside upper wall 7 of base 1 surrounds the outer wall 6 of the container 2 and defines therebetween an annular lower air passage 8 forming part of a duct system. Similarly, the cover inner layer 38 and outer layer 37 form an annular upper air passage or space 39 that is in fluid communication with passage 8 and forms another part of the duct system. Fluid communication between lower air passage 8 and upper air passage 39 is provided by direct registration between a lower air transfer slot 20 at the top of passage 8 and an upper air transfer slot 21 at the bottom of passage 39. The cover geometry is best viewed in FIG. 4. A base plate 13 provides a bottom floor of a cool air chamber 18 forming another part of the duct system and separating it from the heat in chamber 16. A lower wall portion 19 of the container overlies and encloses the cool air chamber 18. The duct system is in fluid communication with the container interior 24 via inlet holes 4 and outlet holes 5. A fan 9 draws air into the duct system through holes 5. As the air is exhausted from the lower portion of fan 9 it passes over cold sink 10, into duct system, including chamber 18 and passages 8 and 39, and reenters the container interior 24 via inlet holes 4. Thus the air within container interior 24 is recirculated and cooled. This system of ducts and inlet and outlet holes assures that food stored in the upper area of the food container is adequately cooled. This system maximizes the distance between the cool air inlet and outlet holes thus maximizing the time the cool air remains within the food container.

Ripening fruit is known to emit ethylene gas and other by-products of organic decomposition. It may be desirable to exhaust these gasses by regular or periodic replacement of the cooling air recirculating within the container interior 24. Referring particularly to FIG. 5, an ambient air conduit 29 comprising a small diameter metering tube extends from the side wall 17 of the base into the duct system 18, 8, 39 where a small volume flow of ambient outside air is drawn in by the cold sink fan 9 and mixed with the recirculated cooling air. As shown, the ambient air conduit 29 opens into the duct system 18, 8, 39 inside of the fan 9. It is believed, however, that the conduit could connect to the duct system at another location therein. The inflow of ambient air may be regulated with the use of an optional pinch valve or metering valve 30 at the inlet end of the conduit 29. To provide for the corresponding exhaust of ethylene and other gaseous by-products, it is preferred to provide a small leak in the container area 24, however, a manually adjustable vent slot may also be used. The slot could be located in either the container or the cover 3.

As indicated previously, the thermoelectric module 12 is normally configured so the upper face is cold while the lower face is hot. Because reversal of the polarity of the supplied current to the thermoelectric module causes the direction of heat flow to be reversed, the fruit chillers of either of the embodiments described herein may also be utilized to warm the fruit to promote or enhance ripening. In this alternate configuration the upper face of the thermoelectric module 12 is hot while the lower face is cold.

Certain fruits may often be purchased in a green or semi-ripe condition. One example is bananas which are often purchased in some semi-ripe condition and allowed to ripen in the open air. By reversal of the supplied current to the thermoelectric module 12, a green or semi-ripe fruit may be ripened more quickly by warming and, when ripe, preserved for a longer time by again reversing the current to provide a cooling air supply to the container 24.

In general, temperature control is an excellent, and by far the best means, of controlling ripening in fruit. As discussed above, warming may be used to enhance and promote ripening of green or semi-ripe fruit, but after the fruit has ripened, cooling is the best means available to slow the biological ripening processes and preserve the fruit for a longer period of time.

The direction of heat transfer of the thermoelectric module 12 can be reversed as mentioned above. The level of heating and cooling can also be controlled by control of the level of supplied current and voltage. In this manner, the user may, for example, select a set point to ripen fruits at a desirable rate or, conversely, a cooling set point to maintain ripened fruit at a temperature found to make the fruit most palatable. Other cooling or warming strategies may also be utilized, either with manual settings by the user or by using programmed microprocessor control.

We claim:

1. A food chiller comprising:

a supporting base including an upwardly concave inner wall and a base portion defining an open interior;

the interior of the base portion divided by a generally horizontal base plate into an upper cooling air chamber and a lower ambient air chamber;

a Peltier effect thermoelectric device mounted in the base plate and thermally connected to a cold sink in the cooling air chamber and a hot sink in the ambient air chamber;

a container nested within the concave inner wall of the base, said container having an outer wall including an upper wall portion defining with said inner base wall an annular semispherical lower air passage and a lower wall portion covering said cooling air chamber;

an upper peripheral edge of said upper wall portion defining a lower air transfer slot from said lower air passage, and the lower wall portion having an air outlet opening to the cooling air chamber;

a cover enclosing the container and supported on an upper peripheral edge of said base wall, said cover having an outer layer and an inner layer defining therebetween an annular semispherical upper air passage extending between an upper air transfer slot in communication with said lower air transfer slot and an air inlet opening in the cover inner layer, such that cooling air uniformly surrounds substantially the entire container outer wall and the cover inner layer;

the cooling chamber and the lower and upper annular passages forming a cooling air duct system; and, a fan mounted in the cooling air chamber between the air outlet opening and the cold sink operative to generate a circulating air flow through the duct system and container.

2. The apparatus as set forth in claim 1 wherein the air inlet opening in the cover inner layer comprises a plurality of holes generally centered in the top of the cover.

3. The apparatus as set forth in claim 1 including a conduit connecting the duct system to ambient outside air.

4. The apparatus as set forth in claim 3 including a valve in said conduit to control the flow of ambient outside air.

5. The apparatus as set forth in claim 1 including control means for said thermoelectric device for controlling the air flow temperature.

6. The apparatus as set forth in claim 5 wherein said control means comprises means for reversing the polarity of the current supplied to the thermoelectric device.

7. The apparatus as set forth in claim 5 wherein said control means comprises means for controlling the magnitude of current and voltage supplied to the thermoelectric device.

8. The apparatus as set forth in claim 1 comprising an exhaust vent from the interior of the container.

9. The apparatus as set forth in claim 8 wherein said vent comprises an adjustable slot in the container or the cover.

10. A food chiller comprising:

a supporting base including an outwardly concave inner wall and a base portion defining an open interior;

the interior of the base portion divided by a generally planar base plate into an outer cooling air chamber and an inner ambient air chamber;

a Peltier effect thermoelectric device mounted in the base plate and thermally connected to a cold sink in the cooling air chamber and a hot sink in the ambient air chamber;

a container nested within the concave inner wall of the base, said container having an outer wall including a first wall portion defining with said inner base wall an annular semispherical first air passage and a second wall portion covering said cooling air chamber;

an outer peripheral edge of said first wall portion defining a first air transfer slot from said first air passage, and the second wall portion having an air outlet opening to the cooling air chamber;

a cover enclosing the container and supported on a peripheral edge of said base wall, said cover having an outer layer and an inner layer defining therebetween an annular semispherical second air passage extending between a second air transfer slot in communication with said first air transfer slot and an air inlet opening in the cover inner layer, such that cooling air uniformly surrounds substantially the entire container outer wall and the cover inner layer;

the cooling chamber and the first and second annular passages forming a cooling air duct system; and, a fan mounted in the cooling air chamber between the air outlet opening and the cold sink operative to generate a circulating air flow through the duct system and container.

11. The apparatus as set forth in claim 10 wherein the air inlet opening in the cover inner layer comprises a plurality of holes generally centered in the outermost portion of said inner layer.

* * * * *